(12) United States Patent
Saal et al.

(10) Patent No.: US 10,106,192 B2
(45) Date of Patent: Oct. 23, 2018

(54) METHOD FOR TEACHING PERMISSIBLE STEERING ANGLES IN A STEERING DEVICE OF A MOTOR VEHICLE

(71) Applicant: AUDI AG, Ingolstadt (DE)

(72) Inventors: Andre Saal, Ingolstadt (DE); Jakob Herman, München (DE); Bastian Weigl, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/550,077

(22) PCT Filed: Jan. 23, 2016

(86) PCT No.: PCT/EP2016/000119
§ 371 (c)(1),
(2) Date: Aug. 10, 2017

(87) PCT Pub. No.: WO2016/128108
PCT Pub. Date: Aug. 18, 2016

(65) Prior Publication Data
US 2018/0237062 A1  Aug. 23, 2018

(30) Foreign Application Priority Data
Feb. 11, 2015 (DE) .................. 10 2015 001 764

(51) Int. Cl.
*B62D 5/04* (2006.01)
*B62D 6/00* (2006.01)
*G06F 15/18* (2006.01)

(52) U.S. Cl.
CPC ........... *B62D 6/002* (2013.01); *B62D 5/0469* (2013.01); *B62D 5/0481* (2013.01); *G06F 15/18* (2013.01)

(58) Field of Classification Search
CPC .... B62D 6/002; B62D 5/0469; B62D 5/0481; G06F 15/18
See application file for complete search history.

(56) References Cited

U.S. PATENT DOCUMENTS 6,408,235 B1 * 6/2002 Tanke, II ............. B62D 5/0469
                                                180/443
6,446,749 B2 * 9/2002 Hackl .................... B62D 5/008
                                                180/204

(Continued)

FOREIGN PATENT DOCUMENTS

DE    19908323 A1 *  8/2000
DE    10221721 A1    11/2003

(Continued)

OTHER PUBLICATIONS

Examination Report dated Oct. 14, 2015 of corresponding German application No. DE10 2015 001 764.0; 6 pgs.

(Continued)

*Primary Examiner* — Michael J Zanelli
(74) *Attorney, Agent, or Firm* — Maier & Maier, PLLC

(57) ABSTRACT

A method for teaching permissible steering angles in a steering device of a motor vehicle. A mechanical or software-side stops that limit the steering angle are present or are temporarily applied at the motor vehicle. On the one hand, the steering force applied to the steering wheel and, on the other hand, the steering angle imposed at the input of the steering box are recorded and evaluated directly or indirectly by means of sensors.

10 Claims, 3 Drawing Sheets

(56) References Cited

U.S. PATENT DOCUMENTS

| | | | | |
|---|---|---|---|---|
| 7,548,807 B2* | 6/2009 | Bohm | ................... | B62D 5/008 |
| | | | | 180/402 |
| 2004/0262071 A1* | 12/2004 | Duits | ................... | B62D 5/005 |
| | | | | 180/402 |
| 2008/0281490 A1* | 11/2008 | Wittig | ................. | B62D 5/0457 |
| | | | | 701/41 |

FOREIGN PATENT DOCUMENTS

| | | |
|---|---|---|
| DE | 102011105064 A1 | 12/2012 |
| DE | 102011122772 A1 | 5/2013 |
| DE | 102012022900 A1 | 5/2014 |
| EP | 2647546 A1 | 10/2013 |

OTHER PUBLICATIONS

International Search Report and Written Opinion dated Apr. 6, 2016 of corresponding application No. PCT/EP2016/000119; 19 pgs.
Notification of Transmittal of Translation of the International Preliminary Report on Patentability dated Aug. 24, 2017, in connection with corresponding international application No. PCT/EP2016/000119 (7 pgs.).

* cited by examiner

METHOD FOR TEACHING PERMISSIBLE STEERING ANGLES IN A STEERING DEVICE OF A MOTOR VEHICLE

FIELD

The invention relates to a method for teaching permissible steering angles in a steering device of a motor vehicle, wherein mechanical and/or software-side stops that limit the steering angle are present or are temporarily applied at the motor vehicle, wherein, on the one hand, the steering force applied to the steering wheel and, on the other hand, the steering angle imposed at the input of the steering box are recorded and evaluated directly or indirectly by means of sensors. Furthermore, the invention relates to a motor vehicle in which a control device is installed, by use of which the method for teaching permissible steering angles can be implemented.

BACKGROUND

In recent times, numerous proposals for employing active front-axle steering in motor vehicles have become known. Said proposals make possible a steering engagement at the front axle that is not dependent on the steering wheel angle. In the motor vehicles now available in series production, so-called superimposed steering systems are installed. In this special type of active steering, an angle is superimposed, that is, imposed, by means of a superimposition gearbox on a steering angle set by means of the steering wheel. The steering angle at the input of the steering box then no longer corresponds to the angle set by the steering wheel. Through this measure, a continuous adjustment of the steering ratio is possible on the one hand, so that, for example, for maneuvering at low speeds, it is possible to adjust a direct gear ratio, as a result of which, during parking, fewer turns of the steering wheel turns are needed, whereas, during highway driving, an indirect gear ratio can be adjusted, as a result of which the motor vehicle can be controlled with finer feel. On the other hand, the superimposition also permits fast engagements in terms of vehicle dynamics. This is understood to mean that, during driving, the wheel angle can be varied largely independently of steering engagements of the person steering the motor vehicle, thereby making possible a fast response in the regulation of vehicle dynamics.

Motor vehicles that include superimposed steering systems are subject to increased tolerance requirements in manufacture and assembly in regard to the steering system or have to be further limited in regard to permissible steering angles than is the case for motor vehicles without superimposed steering. These measures are aimed at preventing any undesired obstruction from being brought about during asymmetrical end stops, resulting under certain circumstances in a jerk at the steering wheel.

The direct consequence of a limited steering angle noticeable to the driver is that the maximum steering angle that exists in actuality cannot be fully exploited, this being manifested in a poorer handling during maneuvering, for example.

In conjunction with conventional servo steering without steering angle superimposition, it is known to record the steering end stops by way of steering movements. Thus, DE 10 2011 105 064 A1 describes a method for detecting and recognizing the end stops of a steering device of a motor vehicle, said steering device having a servo motor. In the process, the actual mechanical end stops of the steering device are recorded and, once the end stops have been recorded, software-controlled end stops are set. Further provided is a memory unit, to which a control device has access and in which steering parameters for different vehicle dynamics parameters and information on at least one permissible steering angle in each steering direction are saved. In a learning routine running with use of the control device, a steering force is applied manually to the steering wheel in both steering directions and the value thereof is recorded directly or indirectly. When the respectively applied steering force exceeds a predetermined value, the steering angle imposed at the input of the steering box is defined as an absolute maximum steering angle in the respective steering direction and saved in the memory unit.

It is further known from DE 10 2011 122 772 A1 to shift a steering device of a wheeled motor vehicle, in particular of a passenger car or truck, which has a steering drive, into a first direction and to record a first maximum travel distance in the first direction and to specify a first limit value on the basis of this recorded first maximum travel distance, and to limit electrically the travel distance of the steering device in the first direction on the basis of the first limit value, wherein the first maximum travel distance is recorded by the steering drive. The procedure in regard to the second (steering) direction is analogous.

Finally, DE 10 2012 022 900 A1 discloses a method and a device for adjusting a software end stop of a steering system of a motor vehicle during driving operation, wherein a steering apparatus makes possible an oversteering of the software end stop when predetermined driving conditions are met, wherein a value of any oversteering of the software end stop that has occurred is recorded by means of a steering angle sensor mechanism, a new position of the software end stop is determined on the basis of the recorded value by processor means, and the software end stop is adjusted to the new position by control means.

Known from DE 102 21 721 A1 is a motor vehicle with a steering system as well as a stop for limiting the maximum angle lock. In the process, it is possible to determine the value of the maximum angle lock as a function of driving parameters, such as, for example, the driving speed or the lateral and longitudinal acceleration. Common to the prior art is the fact that the procedures described are not suitable for superimposed steering.

Starting from the known prior art, the object of the invention is to provide a method that, in the case of motor vehicles with superimposed steering, enables permissible steering angles to be learned by way of manual steering engagements up to the mechanical or software-side stop, that is, to be defined and saved in memory. Furthermore, the object includes the provision of a motor vehicle that can implement the method in accordance with the invention.

SUMMARY OF THE DISCLOSURE

The method for teaching permissible steering angles in a steering device of a motor vehicle proceeds from the assumption that mechanical and/or software-side stops that limit steering angles are present or are temporarily applied at the motor vehicle. Furthermore, it is assumed that, on the one hand, the steering force applied to the steering wheel and, on the other hand, the steering angle imposed at the input of the steering box can be recorded and evaluated directly or indirectly by means of sensors.

In accordance with the invention, the method is employed in connection with a steering, which is a superimposed steering, wherein a superimposed steering angle is imposed on the steering angle created by operation of the steering wheel, controlled by a control device, by means of a superimposition gearbox, and said superimposed steering angle increases or decreases the steering angle as a function of measured vehicle dynamics parameters.

Provided for this purpose is a memory unit, to which the device controlling the superimposed steering has access and in which steering parameters for different vehicle dynamics parameters are saved. In the process, information on at least one permissible steering angle for each steering direction is saved. During a learning routine running with use of the control device, a steering force is applied manually at the steering wheel, preferably several times, in both steering directions and the value of the applied force is recorded directly or indirectly. Then, when the respectively applied steering force exceeds a predetermined value and—in accordance with the invention—after elapse of a predetermined period of time, the steering angle imposed at the input of the steering box is recorded directly or indirectly and defined as an absolute maximum steering angle in the respective steering direction. After determination of the absolute maximum steering angle in both directions of rotation of the steering wheel, at least one permissible steering angle for each steering direction is computed in each case, assigned to the saved steering parameters, and saved in the memory unit. Regardless of any tolerances influencing the position of the mechanical end stops, permissible steering angles are available that exploit the free steering range advantageously to a maximum extent, without any uncomfortable, haptically perceivable repercussions thereby resulting.

The aforementioned steering parameters are setting variables for possible superimposed angles of the superimposition gearbox, with steering parameters for predefined vehicle dynamics parameters existing in each case.

The phrase "vehicle dynamics parameters" is to be understood in connection with superimposed steering and the posed object on which the invention is based as referring, first and foremost, to the motor vehicle speed and/or the change of the steering wheel angle thereof and/or the change of the wheel angle thereof.

In an enhancement of the procedure in accordance with the method, it is of advantage to assign the permissible steering angles directly to the steering parameters. This creates the prerequisite that, when different steering parameters for different vehicle dynamics parameters—for example, for different speeds of the motor vehicle—are saved in memory, the computed permissible steering angles can be saved together with the saved steering parameters. When the computed permissible steering angles for different vehicle dynamics parameters—for example, for different speeds—are different, the saved permissible steering angles can advantageously be retrieved directly together with the saved steering parameters.

In order to avoid errors in the recording of maximum steering angles, it may be of advantage, prior to recording an absolute maximum steering angle, to check whether the recorded steering angle lies in a predefined range of angles. Only in the case that the recorded steering angle lies in the predefined range of angles and does so after elapse of a predefined period of time is the steering angle imposed at the input of the steering box recorded by the control device by query of a rotational angle sensor and defined as an absolute maximum steering angle. In this way, it is advantageously prevented that an increased steering force that occurs owing to static friction of the wheels or owing to an obstacle, for example, is evaluated as being the attainment of the mechanical end stop of the steering. If an increased steering force ensues and if the recorded steering angle does not lie in the predefined range of angles, the learning routine of the control device is terminated.

For recording the predefined period of time, it is advantageous to use a counter, with the counter reading being incremented or decremented by the control device in a loop and compared with a saved reference value or with the value "zero." When the reference value is reached (by incrementing of the counter) or when the value "zero" is attained (by decrementing of the counter), the steering angle imposed at the output of the superimposition gearbox is defined as an absolute maximum steering angle. In the case of decrementing of the counter, said counter was, of course, loaded initially with a saved reference value.

When the learning routine is carried out, it is necessary to realize the maximum steering locks in a safe manner, which is possible only at low motor vehicle speeds. It is advantageous, therefore, to keep the motor vehicle speed during the learning routine at less than 20 kilometers per hour, preferably less than 10 kilometers per hour, with the speed "zero kilometers per hour" being included in this range.

For the purpose of being able to check the recorded maximum steering angle and as further safeguard, it can be of advantage, after the absolute maximum steering angle has been recorded, to display said angle by means of a display device prior to ending the learning routine. On the one hand, it is possible in this way to recognize tendencies in regard to effective tolerances, this being of great importance for the production process; on the other hand, the display makes it possible to check that the maximum steering angle has been correctly recorded by production or service personnel.

For recording the steering force, there exists advantageously the possibility of using an electric variable of the superimposed steering motor. Thus, for example, the current taken up by said motor can be measured in the control device and used to determine the steering force. In the process, the recorded value for a constant steering angle is directly proportional to the steering torque and hence to the steering force applied to the steering wheel.

For recording the steering angle, it is advantageous to utilize the rotational angle sensor at the output of the superimposition gearbox, said rotational angle sensor being present in any case for a superimposed steering as feedback for the correct setting of the steering angle in driving the operation.

Also necessary is a rotational angle sensor at the input of the superimposed steering gearbox. Said rotational angle sensor serves in conjunction with the rotational angle sensor at the output for determination of the total angle at the steering box or at the wheels.

If a superimposition gearbox in the steering column is used, then the total angle used at the steering box or at the wheels has to be corrected by a superimposed angle component resulting from the torsion of the steering column under a manual torque. This is necessary in order that, in the mechanical/software-side end stop, only the actual steering angle up to attainment of the end stop is used for the learning routine.

The invention further relates to a motor vehicle with a superimposed steering, which comprises a superimposition gearbox, wherein a control device and a memory unit for implementation of the method are provided.

It is noted that the system components described above and also below do not necessarily need to be designed as hardware components. Instead, it is conventional at the present time to design such components as software routines, which are executed by means of computing units and make use of existing hardware components such as sensors, actuators, etc. Motor vehicles that are presently in use generally have a plurality of such computing units, which are interlinked with one another for data transmission and execute a most diverse variety of control, regulation, analysis, monitoring, and data transmission routines. Likewise employed in conventional modern motor vehicles are a plurality of sensors and actuators, which can be utilized in part for different purposes. The terms sensors and actuators are to be understood here in their most general meaning.

BRIEF DESCRIPTION OF THE DRAWING

Further embodiments and advantages of the invention will be discussed in detail below on the basis of the drawing. Shown are.

DETAILED DESCRIPTION OF THE DRAWING

Figure 1:
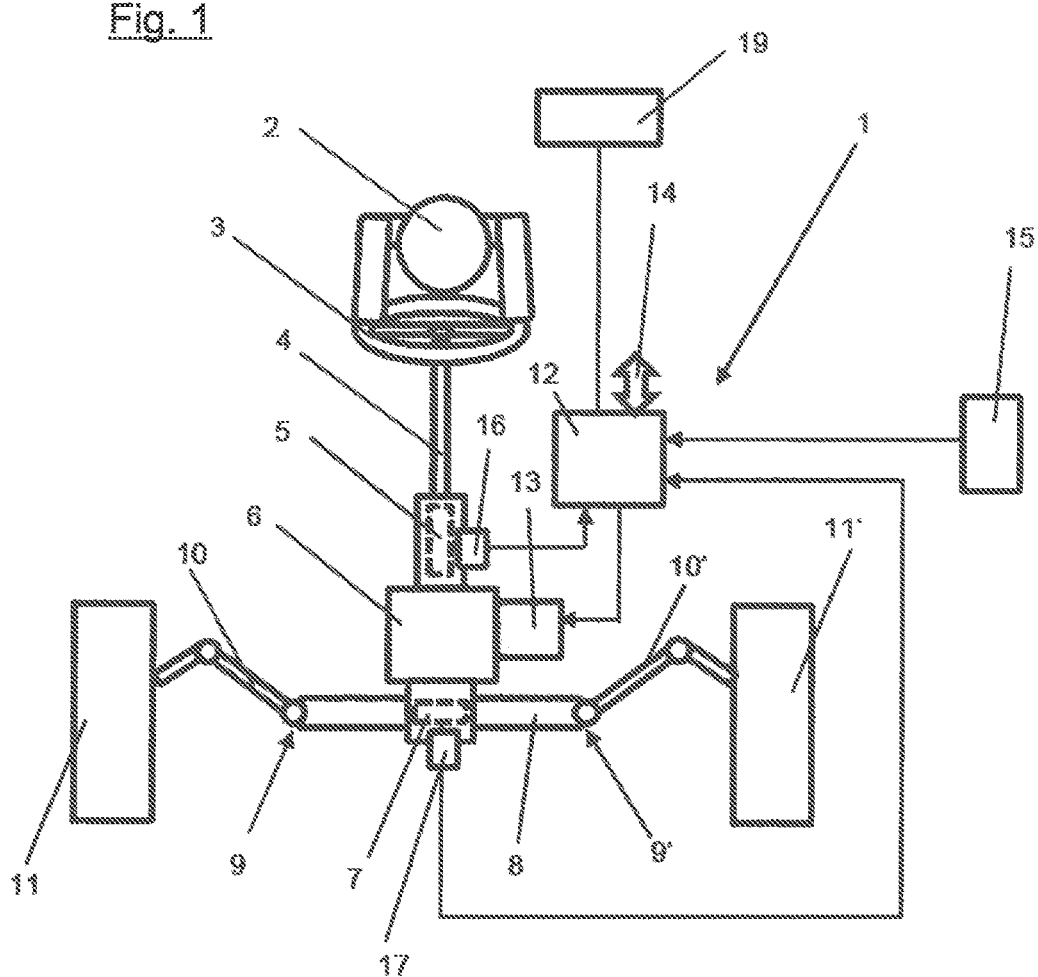
FIG. 1 a schematic illustration of a superimposed steering.

The illustration in FIG. 1 shows a superimposed steering 1, which is arranged in a motor vehicle and illustrated in a simplified manner. The steering movements of the driver 2 are transmitted via the steering wheel 3 and the steering column 4 to the input 5 of the superimposition gearbox 6. The steering box is arranged at the output end of the superimposition gearbox 6. It has a pinion 7, which engages with a rack 8, the two ends of which, 9, 9' are joined via tie rods 10, 10' to the two steerable front wheels 11, 11'.

In departure from the example of FIG. 1, the superimposition gearbox can also be installed in the steering column and is then joined via an intermediate steering shaft to the steering box.

Provided for control of the superimposition gearbox 6 is a control device 12, which acts via an actuator 13, such as, for example, an electric motor, on the superimposition gearbox 6 and sets correct superimposed angles in relation to the vehicle dynamics parameters. For control of the superimposed angle, the control device 12, on the one hand, via a bus system 14, has access to the actual vehicle dynamics data, which are acquired via sensors (not illustrated) arranged in or on the motor vehicle. On the other hand, data for different superimposed angles are saved for different vehicle dynamics data in a memory unit 15 and can be retrieved by the control device 12. The data are addressed to the superimposed angles by use of the vehicle dynamics data in such a way that specific vehicle dynamics data are assigned through memory technology to specific data relating to the superimposed angles.

Further provided is a torque sensor 16, which detects the torque that is applied by the driver 2 on the steering wheel 3 and, via the latter and the steering column 4, onto the input 5 of the superimposition gearbox 6. The torque sensor 16 can be queried by the control unit 12.

For feedback of the steering output angle actually adjusted by means of the superimposition gearbox 6, a rotational angle sensor 17 is provided. What is involved in this case is an incremental rotary encoder, which detects both the direction of rotation and the angle of rotation at the output of the superimposition gearbox. The rotational angle sensor 17 can be queried by the control device 12.

In departure from the illustrated example, it is also possible, of course, to use the integrated rotational angle sensor of the steering box, if it has such a sensor.

The query of the torque sensor 16, as well as of the rotational angle sensor 17 can be made via separate connections, such as illustrated in FIG. 1 in a simplified manner, or via bus systems, such as those available at the present time in motor vehicles. The corresponding situation also applies, of course, to the memory unit 15. It is to be noted further that what is necessarily involved in the case of the control device 12 is not a hardware device specifically suited only for this purpose, but rather it is presently common to execute a most diverse variety of control sequences virtually in parallel on computing units by means of control routines; that is, it is possible to create a control device temporarily on a computing unit by means of a control program. What is described above and below is to be understood in this connection.

Furthermore, the control device 12 is connected to a display 19 for output of messages.

For completeness, it still needs to be mentioned that, in modern motor vehicles, servo devices that assist the steering force are generally installed, but, in the connection described here, they have no influence and therefore are not illustrated in FIG. 1 and consequently they are not described in more detail.

Figure 2:
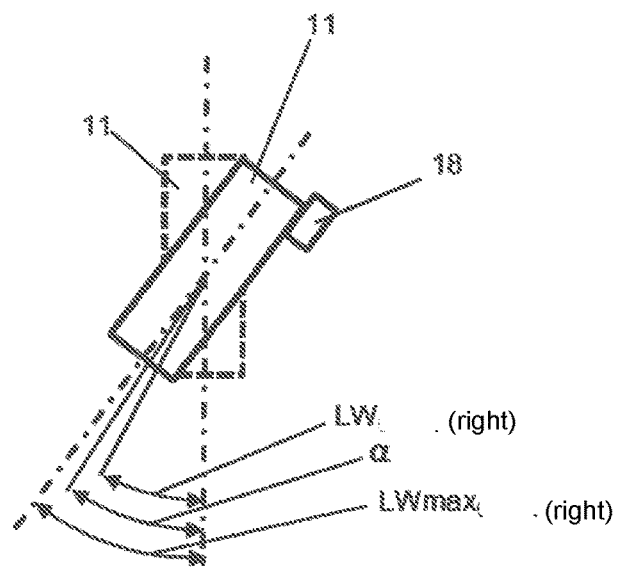
FIG. 2 a first simplified illustration of a wheel at the steering end stop.

The illustration in FIG. 2 shows the front wheel 11, depicted in FIG. 1 on the right as seen by the driver 2, in a first position, in neutral position, that is, with the steering angle "zero" (illustrated by the dashed line). If the wheel 11 is now likewise turned to the right by rotation of the steering wheel 3 (FIG. 1) (illustrated by the solid line), it strikes the stop 18, which limits the steering angle. The associated steering angle is referred to here as the maximum steering angle $LW_{max(right)}$. The stop 18 can be designed as a stop constructed at the motor vehicle or as a stop that is applied temporarily at the motor vehicle or as a software stop. A software stop is understood here to mean that, for a predetermined steering angle in the steering device, a torque directed against the steering force of the driver 2 is applied, said torque simulating a mechanical stop. Furthermore, the stop 18 need not necessarily engage at the wheel 11, as illustrated in FIG. 1, but instead can also engage at another point, such as, for example, at the rack or at the tie rod, and limit the steering angle. Nevertheless, the arrangement shown in FIG. 2 has the advantage that, when the maximum steering angle and the permissible steering angle obtained from it are determined, the tire width is taken into account. As is elaborated below in detail, the permissible steering angle—in the example in accordance with FIG. 2, the permissible steering angle $LW_{(right)}$—is determined computationally by the control device 12 (FIG. 1), as described below in detail.

Inscribed between the permissible steering angle $LW_{(right)}$ and the maximum steering angle $LW_{max(right)}$ in FIG. 2 is a further angle $\alpha$, which can be employed in order to ensure that the maximum steering angle $LW_{max(right)}$, which needs to be determined in the course of the method according to the invention, lies in a permissible range. In the process, the angle $\alpha$ is less than or equal to the angle that can theoretically be assumed to be the smallest occurring maximum steering angle when, during manufacture and assembly, the maximum tolerances occurring during steering are taken into consideration. If the steering angle determined in accordance with the method according to the invention is greater than or equal to the angle $\alpha$, it is valid; if not, it is invalid.

Data that define the angle α are saved permanently in a memory unit, which can be accessed by the control device 12 (FIG. 1).

As already discussed in the beginning, the maximum steering angle—in FIG. 2, the maximum steering angle $LW_{max(right)}$—is only an intermediate value determined from the at least one permissible steering angle $LW_{(right)}$. A permissible steering angle is understood here to mean that what is involved is a steering angle to be computed by the control device, said steering angle resulting from the maximum permissible steering angle $LW_{max(right)}$ less an offset. Such permissible steering angles $LW1_{(right)}$ to $LW3_{(right)}$ are illustrated in FIG. 3, in which the illustration corresponds to the illustration of FIG. 2 in regard to the wheel 11 and the stop 18.

Different permissible steering angles are then determined when this is provided for different vehicle dynamics parameters. This is routinely the case then when, during maneuvers in the low-speed range, the permissible steering angle needs to be maximally exhausted up to the maximum steering angle.

Figure 3:
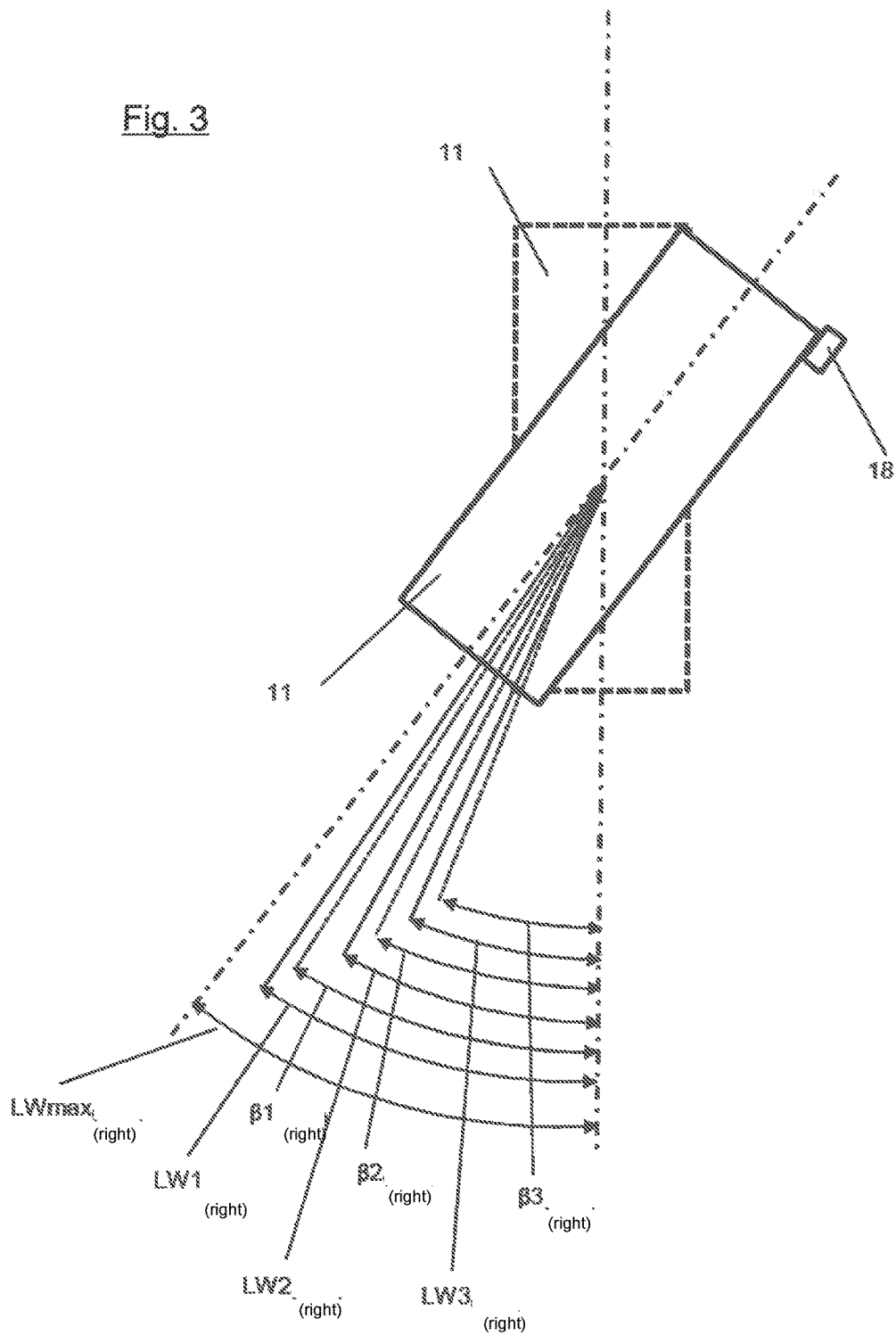
FIG. 3 a second simplified illustration of a wheel at the steering end stop, and FIG. 4 a simplified flow chart of the method.

Resulting from the above in the case of the example in accordance with FIG. 3 is that, on the one hand, the maximum steering angle $LW_{max(right)}$ can be a permissible steering angle at low maneuvering speeds and that any number of permissible steering angles—in the example in accordance with FIG. 3, the permissible steering angles $LW1_{(right)}$ to $LW3_{(right)}$—can be defined for different vehicle dynamics parameters or for combinations of such vehicle dynamics parameters. The phrase "combinations of vehicle dynamics parameters" is understood here to mean that, for example, the speed is considered or any combination of vehicle dynamics parameters is considered together, so that different permissible steering angles ensue, for example, for identical speeds and different engine torques.

It is to be noted that, in the examples in accordance with FIGS. 2 and 3 above, only the steering direction to the "right" is regarded; obviously, the relations can be applied in analogy to the steering direction "left."

Figure 4:
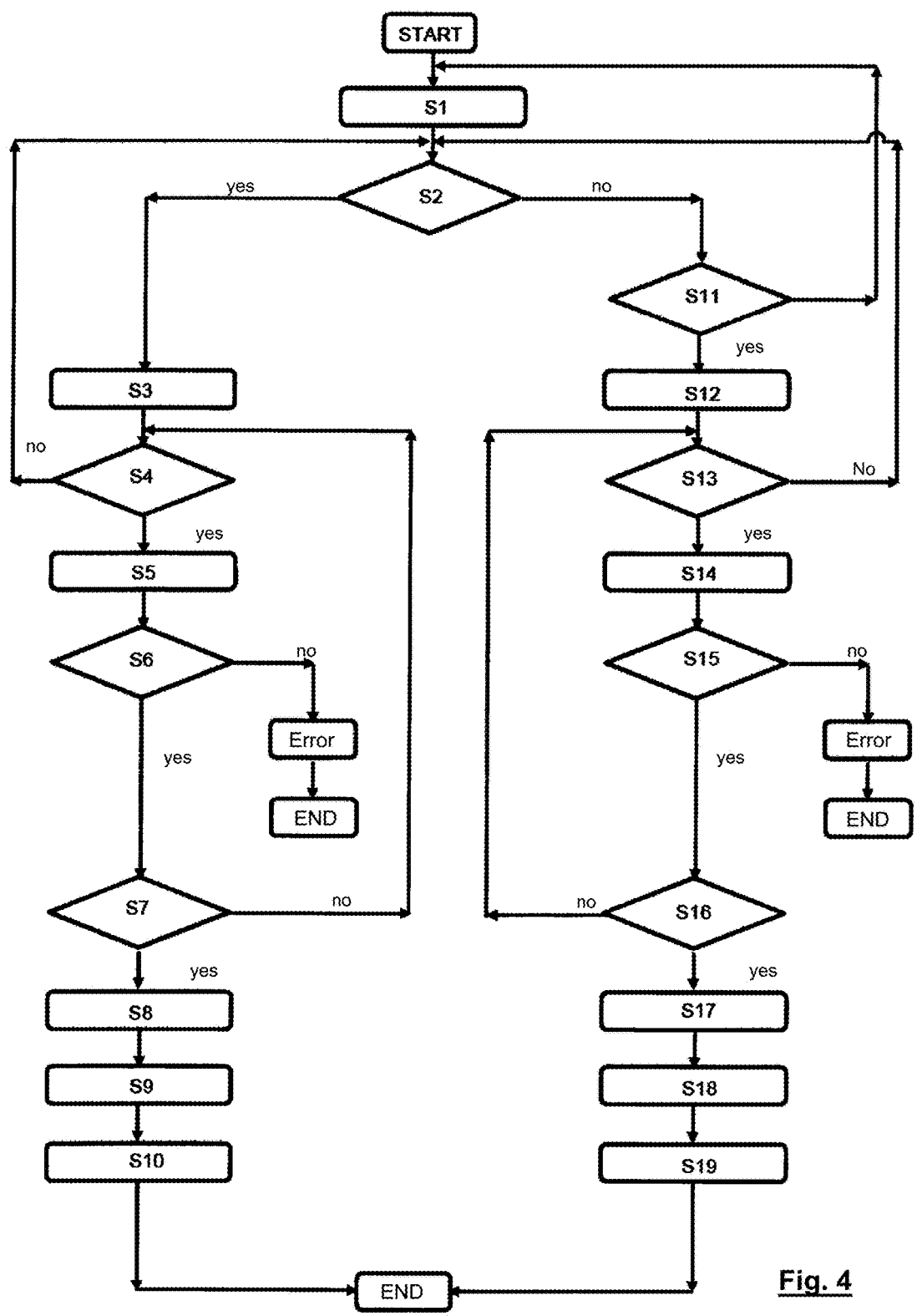

After the instrumental prerequisites and the relevant variables that are important in connection with the method for teaching permissible steering angles LW1 to LWn for a superimposed steering device have been defined above, it is necessary in the following to illustrate the method itself by way of example in connection with the flow chart in accordance with FIG. 4. The control steps in FIG. 4 are furnished with reference characters S1 to S19, wherein the description follows these control steps, in each case with stipulation of the reference character of the respective control step.

As already mentioned in the beginning, the routine for detecting the permissible steering angle LW is initiated by a start command. Said start command can be entered preferably in a diagnostic mode and especially preferred, via a temporarily connectable service device. Thus, the routine is initiated with a first step S1.

Step S1: The control device 12 queries via the bus system 14 whether the motor vehicle speed is less than or equal to $V_{max}$, where $V_{max}$ is the speed up to which the routine should be implemented. If "yes," continue with Step S2; if "no," terminate the routine.

Step S2: The control device 12 queries "direction of rotation to the right" (query of the rotational angle sensor 17); if "yes," continue with Step S3, if "no," continue with Step S11.

Step S3: The control unit 12 sets a software counter to the counter reading "Z=zero"; continue with Step S4.

Step S4: The control device 12 queries "torque greater than X" (query of the torque sensor 16), where "X" is a fixed predetermined value that can be retrieved from a memory unit by the control unit 12; if "yes," continue with Step S5, if "no," continue with Step S2.

Step S5: The control unit increases the counter reading of the software counter by "1"; continue with Step S6.

Step S6: The control unit 12 queries whether the angle of rotation input at the angle of rotation encoder 17 is >=the angle α, where α is a fixed predetermined value "α" that can be retrieved from a memory unit by the control unit 12; if "yes," continue with Step S7, if "no," terminate the routine.

Step S7: The control unit 12 queries whether the software counter is at the counter reading "$Z=Z_{max}$", where "$Z_{max}$" is a fixed predetermined value that can be retrieved from a memory unit by the control unit 12; if "yes," continue with Step S8, if "no," continue with Step S4.

Step S8: The control unit 12 queries the angle of rotation applied at the angle of rotation encoder 17 and saves it as a maximum steering angle $LW_{max(right)}$; continue with Step S9.

Step S9: The control unit 12 calculates from the maximum steering angle $LW_{max(right)}$ the permissible steering angles $LW1_{(right)}$ to $LWn_{(right)}$, by subtracting different offset values separately in each case from the maximum steering angle $LW_{max(right)}$, where the different offset values are fixed predetermined values that can be retrieved from a memory unit. The control unit then assigns the computed permissible steering angles $LW1_{(right)}$ to $LWn_{(right)}$ to saved steering parameters, where the offset values determine which permissible steering angles $LW1_{(right)}$ to $LWn_{(right)}$ belong to which steering parameters and saves the permissible steering angles $LW1_{(right)}$ to $LWn_{(right)}$ for the steering parameters in the memory unit 15; continue with Step S10.

Step S10: The control unit 12 shows the maximum steering angle $LW_{max(right)}$ by means of the display 19 and ends the routine.

Step S11: The control device 12 queries "direction of rotation to the left" (query of the rotational angle sensor 17); if "yes," continue with Step S12, if "no," continue with Step S1.

Step S12: The control unit 12 sets a software counter to the counter reading "Z=zero"; continue with Step S13.

Step S13: The control device 12 queries "torque greater than X1" (query of the torque sensor 16), where "X1" is a fixed predetermined value that can be retrieved from a memory unit by the control unit 12; if "yes," continue with Step S14, if "no," continue with Step S2.

Step S14: The control unit 12 augments the counter reading of the software counter by "1"; continue with Step S15.

Step S15: The control unit 12 queries whether the angle of rotation applied at the angle of rotation encoder 17 is greater than or equal to the angle α1, where α1 is a fixed predetermined value "α1" that can be retrieved from a memory unit by the control unit 12; if "yes," continue with Step S16, if "no," error message via a display 19 (optically and/or acoustically) and terminate the routine.

Step S16: The control unit 12 queries whether the software counter stands at the counter reading "$Z=Z_{max}$", where "$Z_{max}$" is a fixed predetermined reference value that can be retrieved from a memory unit by the control unit 12; if "yes," continue with Step S17, if "no," continue with Step S13.

Step S17: The control unit 12 queries the angles of rotation applied at the angle of rotation encoder 17 and saves these as the maximum steering angles $LW_{max(left)}$; continue with Step S18.

Step S18: The control unit 12 calculates from the maximum steering angle $LW_{max(left)}$ the permissible steering angles $LW1_{(left)}$ to $LWn_{(left)}$ by subtracting different offset values separately in each case from the maximum steering angle $LW_{max(left)}$, where the different offset values are fixed predetermined values that can be retrieved from a memory unit. The control unit 12 then assigns the computed permissible steering angles $LW1_{(left)}$ to $LWn_{(left)}$ to saved steering parameters, where the offset values determine which permissible steering angles $LW1_{(left)}$ to $LWn_{(left)}$ belong to which steering parameters and saves the permissible steering angles $LW1_{(left)}$ to $LWn_{(left)}$ for the steering parameters in the memory unit 15; continue with Step S19.

Step S19: The control unit 12 shows the maximum steering angle $LWn_{(left)}$ by means of the display unit 19 and ends the routine.

The method sequence described above by way of example can, of course, be altered in diverse ways, without the fundamental procedure being affected; the exemplary character is therefore to be especially emphasized.

The invention claimed is:

1. A method for teaching permissible steering angles in a steering device of a motor vehicle, wherein mechanical or software-side stops that limit the steering angle are present or are temporarily applied at the motor vehicle, wherein, on the one hand, a steering force applied to a steering wheel and, on the other hand, a steering angle imposed at an input of a steering box are recorded and evaluated directly or indirectly by means of sensors, comprising:

the steering device is a superimposed steering with a superimposition gearbox, wherein a superimposed steering angle is imposed on the steering angle created by the actuation of the steering wheel, controlled by a control device, by the superimposition gearbox, and said superimposed steering angle increases or decreases the steering angle as a function of measured vehicle dynamics parameters;

a memory unit is provided, to which the control device controlling the superimposed steering has access and in steering parameters for different vehicle dynamics parameters are saved, and wherein information on at least one permissible steering angle is saved in each steering direction in the memory;

in a learning routine running with use of the control device, a steering force is applied manually on the steering wheel in both steering directions and the value of the applied force is recorded directly or indirectly and then, when the respectively applied steering force exceeds a predetermined value and after elapse of a predetermined period of time, the steering angle imposed at the output of the superimposition gearbox is recorded directly or indirectly by the control device and is defined as an absolute maximum steering angle in the respective steering direction;

after determination of the absolute maximum steering angle in both directions of rotation of the steering wheel, at least one permissible steering angle is computed in each case by means of the control device;

the at least one computed permissible steering angle in each steering direction is assigned to the saved steering parameters and saved in the memory unit.

2. The method according to claim 1, wherein different steering parameters are saved in the memory unit and different computed permissible steering angles are assigned to the saved steering parameters by the control device.

3. The method according to claim 1, wherein the computed permissible steering angles are different for different speeds of the motor vehicle.

4. The method according to claim 1, wherein, prior to recording an absolute maximum steering angle by the control device, it is checked whether the recorded steering angle is greater than or equal to a predefined angle and, in the case that the recorded steering angle is greater than or equal to the predefined angle and after elapse of a predetermined period of time, the steering angle imposed at the output of the superimposition gearbox is recorded by the control device and is defined as the absolute maximum steering angle and, in the case that the recorded steering angle is less than the predefined angle, the control device terminates the learning routine and outputs an error message.

5. The method according to claim 1, wherein, for recording the period of time, a counter is used, where the counter is set either to the counter reading zero and then cyclically incremented and cyclically compared with a saved reference value or is set to a saved reference value and cyclically decremented and is compared cyclically with the value zero, and in that, when the reference value or the value zero is reached, the steering angle imposed at the output of the superimposition gearbox and recorded by the control device is defined as the absolute maximum steering angle.

6. The method according to claim 1, wherein the learning routine, monitored by the control device, is carried out at a driving speed Vmax of less than 20 kilometers per hour, including zero kilometers per hour.

7. The method according to claim 1, after recording the absolute maximum steering angle, said angle is displayed, prior to termination of the learning routine, by a display device that can be controlled by the control device.

8. The method according to claim 1, wherein, in the superimposed steering, an input subjected to the steering force is arranged, and the steering force imposed during the learning routine on the steering wheel is recorded at the input of the superimposed steering by means of a torque sensor by way of the control device, wherein the recorded value at constant steering angle is directly proportional to the steering torque and thus directly proportional to the steering force that is applied to the steering wheel.

9. The method according to claim 1, wherein the steering angle is recorded by an angle of rotation sensor at the output of the superimposition gearbox.

10. The method according to the claim 1, the learning routine can be implemented for learning the permissible steering angles, only in a diagnostic mode by way of the control device.

* * * * *